United States Patent [19]
Goto et al.

[11] Patent Number: 5,148,321
[45] Date of Patent: Sep. 15, 1992

[54] COMPACT ZOOM LENS SYSTEM

[75] Inventors: Hisashi Goto; Masaki Imaizumi; Shigeru Kato, all of Tokyo, Japan

[73] Assignee: Olympus Optical Co., Ltd., Tokyo, Japan

[21] Appl. No.: 677,658

[22] Filed: Mar. 29, 1991

[30] Foreign Application Priority Data

Mar. 30, 1990 [JP] Japan .................................. 2-81027

[51] Int. Cl.$^5$ ...................... G02B 15/14; G02B 13/18
[52] U.S. Cl. .................................. 359/689; 359/716
[58] Field of Search ................. 350/423, 427, 432; 359/676, 689, 716

[56] References Cited
U.S. PATENT DOCUMENTS

| 4,854,682 | 8/1989 | Yamanashi | 350/427 |
| 4,983,027 | 1/1991 | Kojima et al. | 350/427 |
| 5,002,373 | 3/1991 | Yamanishi | 350/427 |

FOREIGN PATENT DOCUMENTS 63-153511 6/1988 Japan .
1-230013 9/1989 Japan .
2-16515 1/1990 Japan .

Primary Examiner—Bruce Y. Arnold
Assistant Examiner—David R. Parsons
Attorney, Agent, or Firm—Cushman, Darby & Cushman

[57] ABSTRACT

A compact zoom lens system comprising, in the order from the object side, a first lens unit having a positive refractive power, an aperture stop, a second lens unit having a positive refractive power and a third lens unit having a negative refractive power; and adapted so as to perform variation of focal length from the wide position to the tele position by moving the first lens unit and the third lens unit from the image side toward the object side, and displacing the second lens unit and the aperture stop so as to widen the airspace reserved between the first lens unit and the second lens unit, and narrow the airspace reserved between the second lens unit and the third lens unit. This zoom lens system has a total length shortened by thinning the first lens unit.

11 Claims, 13 Drawing Sheets

COMPACT ZOOM LENS SYSTEM

BACKGROUND OF THE INVENTION 1. a) Field of the invention

The present invention relates to a compact zoom lens system which is to be incorporated in lens shutter cameras and so on.

2. b) Description of the prior art

Under the recent trend to use more and more compact cameras, it is necessary to develop zoom lens systems which are more compact in dimensions and lighter in weight. Especially, a strong demand is posed for a compact zoom lens system which is to be used in the so-called lens shutter cameras allowing no exchange of lens systems, and has a vari-focal ratio of 2 to 3 and a simple composition.

It is unnecessary for such a zoom lens system to be incorporated in the lens shutter cameras, unlike the lens systems to be used in the single lens reflex cameras, to reserve a specific back focal length. When the zoom lens system to be incorporated in the lens shutter cameras has too short a back focal length, however, the lens component arranged on the image side in the zoom lens system will have a large diameter, thereby making it impossible to design the lens system compact. Further, flare is apt to be produced by detrimental rays in this zoom lens system.

As a zoom lens system which is designed taking this point into consideration and capable of having favorable imaging performance, there is known the lens system disclosed by Japanese Patent Kokai Publication No. Sho 63-153511. This zoom lens system is composed, in the order from the object side, of a first lens unit having a positive refractive power, a second lens unit having a positive refractive power and a third negative lens unit, adapted so as to perform variation of focal length by varying the airspaces reserved between the lens units along the optical axis, and designed so as to satisfy the following conditions:

$$0.2 < \Phi_I/\Phi_W > 0.9$$

$$1.1 > \Phi_{12W}/\Phi_W > 1.9$$

$$1.5 > \beta_{3T}/\beta_{3W} > 2.8$$

wherein the reference symbol $\Phi_w$ represents the refractive power of the zoom lens system as a whole at the wide position, the reference symbol $\Phi_1$ designates the refractive power of the first lens unit, the reference symbol $\Phi_{12W}$ denotes the total refractive power of the first lens unit and the second lens unit at the wide position, the reference symbol $\oplus_{3W}$ represents the lateral magnification of the third lens unit at the wide position, and the reference symbol $\beta_{3T}$ designates the lateral magnification of the third lens unit at the tele position.

Furthermore, the zoom lens system proposed by Japanese Patent Kokai Publication No. Hei 1-230013 has a composition similar to that of the zoom lens system disclosed by the above-mentioned Japanese Patent Kokai Publication No. Sho 63-153511, is adapted so as to perform variation of focal length by moving the first lens unit and the third lens unit integrally, and adopts a lens barrel having a simplified structure.

Moreover, the zoom lens system disclosed by Japanese Patent Kokai Publication No. Hei 2-16515 consists, like the conventional examples described above, of a first positive lens unit, a second positive lens unit and a third negative lens unit which are arranged in order from the object side. In this zoom lens system, an aperture stop is arranged outside the second positive lens unit for simplifying structure of the lens barrel.

However, each of the conventional zoom lens systems described above has a complicated composition and is not sufficiently compact.

SUMMARY OF THE INVENTION

A primary object of the present invention is to provide a compact zoom lens system which has a shortened total length and aberrations corrected sufficiently favorably.

Another object of the present invention is to provide a compact zoom lens system which has aberrations corrected favorably over the entire vari-focal range thereof.

The zoom lens system according to the present invention comprises, in order from the object side, a first lens unit having a positive refractive power, a second lens unit having a positive refractive power and a third lens unit having a negative refractive power, in addition to an aperture stop arranged before the second lens unit. Focal length of the zoom lens system according to the present invention is varied from the wide position to the tele position by moving the first lens unit and the third lens unit from the image side toward the object side, and displacing the second lens unit and the aperture stop integrally so as to widen the airspace reserved between the first lens unit and the second lens unit and narrow the airspace reserved between the second lens unit and the third lens unit. Further, the zoom lens system according to the present invention is designed so as to satisfy the following condition (1):

$$0.09 < D_1/IH < 0.32 \qquad (1)$$

wherein the reference symbol D1 represents the thickness of the first lens unit as measured on the optical axis and the reference symbol IH designates the length equal to half the diagonal line of the image surface.

If the upper limit of the condition (1) is exceeded, the first lens unit will have an increased thickness on the optical axis and the entrance pupil is located farther from the first lens unit toward the image side, whereby the front lens component will have a larger diameter and the zoom lens system cannot be compact. If the lower limit of the condition (1) is exceeded, it will be impossible to correct aberrations favorably in the zoom lens system according to the present invention and the first lens unit will be too thin for practical manufacturing.

By designing at least one of the surfaces arranged in the first lens unit as a surface convex toward the object side, it is possible to locate the principal point of the first lens unit on the object side thereof and shorten the total length of the zoom lens system according to the present invention.

In the zoom lens system according to the present invention, the aperture stop is arranged before the second lens unit and is moved integrally with the second lens unit for varying the focal length of the lens system. When the aperture stop is arranged before the second lens unit as described above, the off axial ray is incident at a lower height on the first lens unit especially at the wide position, thereby making it possible to reduce the diameter of the first lens unit. Accordingly, it is possible to enhance curvature on each of the surfaces used in the first lens unit, control amounts of aberrations to be produced by the most object side surface and correct aberrations favorably with a simple composition. Further, by designing this surface as a surface convex toward the object side, it is possible to locate the principal point of the first lens unit farther on the object side thereof so as to permit further shortening the total length of the zoom lens system. Moreover, structure of the lens barrel can be simplified when the aperture stop is moved integrally with the second lens unit for varying the focal length of the zoom lens system as described above. In addition, it is possible to obtain a high aperture ratio at the tele position while keeping the diameter of the aperture stop constant or without changing it so remarkably for variation of the focal length.

Furthermore, one of the characteristics of the zoom lens system according to the present invention lies in that aberrations are corrected favorably over the entire range of the vari-focal range thereof by selecting an adequate composition for the second lens unit. Speaking concretely, the second lens unit is designed so as to comprise, in the order from the object side, at least a negative meniscus lens component having a concave surface on the object side and a lens component having a convex surface on the object side.

It is possible to control spherical aberration by arranging the negative meniscus lens component having the concave surface on the image side at the object side location in the second lens unit, and aberrations can be corrected favorably with a simple composition by arranging the positive lens component having the convex surface on the object side at the image side location in the second lens unit.

It is desirable for correction of aberrations that the second lens unit having the composition described above is designed so as to satisfy the following conditions (2) and (3):

$$0.5 < |R_{22}| \cdot \Phi_W < 2 \quad (2)$$
$$0.2 < |R_{23}| \cdot \Phi_W < 0.6 \quad (3)$$

wherein the reference symbols $R_{22}$ and $R_{23}$ represent the radii of curvature on the second surface and the third surface as counted from the object side in the second lens unit, and the reference symbol $\Phi_W$ designates the refractive power of the zoom lens system as a whole at the wide position.

The condition (2) is adopted for correcting aberrations with good balance in the zoom lens system as a whole by producing aberrations in adequate amounts by the second lens unit. If the upper limit of the condition (2) is exceeded, correction of aberrations, especially coma, will not be sufficient. If the lower limit of the condition (2) is exceeded, the refractive power of the negative meniscus lens component will be weakened, thereby making it impossible to correct aberrations with good balance in the zoom lens system as a whole.

If the upper limit of the condition (3) is exceeded, it will be impossible to reduce the angle formed between the optical axis and the off axial ray after being refracted by the third surface as counted from the object side in the second lens unit and it will be difficult to correct this angle by the fourth and later surfaces arranged in the second lens unit. If the lower limit of the condition (3) is exceeded, rays will have large angles of incidence on the third surface as counted from the object side in the second lens unit, whereby aberrations will be produced in amounts that are too large amounts and cannot be corrected with good balance by the other surfaces.

For correcting aberrations at all field angles of the zoom lens system according to the present invention, it is desirable to form, on the object side of a positive lens component arranged in the second lens unit, an air lens which has a meniscus shape convex toward the object side. In this case, it is desirable that the image side surface of said air lens has a refractive power satisfying the following condition (4):

$$1.2 < \Phi_{2R}/\Phi_2 < 3 \quad (4)$$

wherein the reference symbol $\Phi_{2R}$ represents the refractive power of the image side surface of the air lens and the reference symbol $\Phi_2$ designates the refractive power of the second lens unit.

If the lower limit of the condition (4) is exceeded, it will be necessary to prolong the distance as measured from the rear principal point of the lens component arranged on the object side of the air lens to the front principal point of the lens component arranged on the image side of the air lens in the second lens unit, thereby, undesirably, making it necessary to prolong the length of the second lens unit. If the upper limit of the condition (4) is exceeded, in contrast, the refractive power $\Phi_{2R}$ will be too strong, thereby making it difficult to correct aberrations favorably with a simple composition of the second lens unit.

Aberrations can be corrected favorably by designing the second lens unit so as to satisfy the above-mentioned conditions, and composing it of lens components in a number as small as four, i.e., a meniscus lens component having a convex surface on the image side and a negative refractive power, a lens component having a convex surface on the object side, a positive lens component having a convex surface on the object side and a positive lens component having a convex surface on the image side which are arranged in the order from the object side.

Furthermore, it is more desirable to compose for the zoom lens system according to the present invention as described below.

Structure of the lens barrel can be simplified and the camera comprising the zoom lens system can be made compact when the first lens unit and the third lens unit are moved integrally in the zoom lens system according to the present invention which has the composition described above.

Further, it is desirable to design the second lens unit of the zoom lens system according to the present invention so as to satisfy the following condition (5):

$$0.03 < H_2/IH < 0.24 \quad (5)$$

wherein the reference symbol $H_2$ represents the distance between the principal points of the second lens unit.

If the upper limit of the condition (5) is exceeded, the distance between the principal points of the second lens unit will be too long, or the first lens unit will be located too far from the third lens unit, thereby making it impossible to design the zoom lens system compact. If the lower limit of the condition (5) is exceeded, it will be difficult to correct aberrations favorably when the second lens unit has a simple composition.

Furthermore, it is desirable to design the first lens unit so as to use at least one surface convex toward the object side as already described above, comprise at least one positive lens element and at least one negative lens element, and satisfy the following conditions (6) and (7):

$$10 < v_p - v_n < 62 \quad (6)$$

$$0.22 < r_1 \cdot \Phi_w < 1.25 \quad (7)$$

wherein the reference symbols $v_p$ and $v_n$ represent the Abbe's numbers of the positive lens element and the negative lens element respectively arranged in the first lens unit, the reference symbol $r_1$ designates the radius of curvature on the most object side surface arranged in the first lens unit, and the reference symbol $\Phi_w$ denotes the refractive power of the zoom lens system as a whole.

If the upper limit or the lower limit of the condition (6) is exceeded, it will be difficult to correct chromatic aberration.

If the upper limit of the condition (7) is exceeded, the most object side surface will produce remarkable aberrations which can hardly be corrected favorably with a simple composition of the first lens unit or an attempt for favorable correction of aberrations will be conflicting with a compact design of the zoom lens system. If the lower limit of the condition (7) is exceeded, in contrast, the most object side surface will have too small a radius of curvature and the lens element to be arranged on the object side can hardly be manufactured in practice.

The characteristics of the lens system according to the present invention described above exhibit the effects thereof when applied to a zoom lens system which satisfies each of the conditions shown below:

$$0.2 < \Phi_1/\Phi_w < 0.9$$

$$1.1 < \Phi_{12w}/\Phi_w < 1.9$$

$$1.5 < \beta_{3T}/\beta_{3W} < 2.8$$

wherein the reference symbol $\Phi_w$ represents the refractive power of the zoom lens system as a whole at the wide position, the reference symbol $\Phi_1$ designates the refractive power of the first lens unit, the reference symbol $\Phi_{12w}$ denotes the total refractive power of the first lens unit and the second lens unit at the wide position, and the reference symbols $\beta_{3w}$ and $\beta_{3T}$ represent the lateral magnifications of the third lens unit at the wide position and the tele position respectively.

Moreover, the zoom lens system according to the present invention can be focused by moving the second lens unit or the third lens unit. However, the focusing by moving the third lens unit is undesirable since the third lens unit is brought close to the image surface when the zoom lens system is focused on an object located at a short distance, thereby making it necessary to enlarge the diameter of the lens element arranged on the image side in the third lens unit. The focusing by moving the second lens unit does not cause variation of the airspace reserved between the first lens unit and the third lens unit especially in the zoom lens system wherein the first lens unit and the third lens unit are moved integrally for variation of focal length, thereby making it possible to simplify the structure of the lens barrel and make compact the camera incorporating the zoom lens system.

In addition, aberrations can be corrected more favorably by using aspherical surfaces in the second lens unit and the third lens unit.

When the direction of the optical axis is taken as the x axis and the direction perpendicular to the optical axis is taken as the y axis, the shapes of the aspherical surfaces is expressed by the following formula:

$$x_k = Y_k^2/\{r_k + r_k \sqrt{1 - (y_k/r_k)^2}\} +$$

$$A_k Y_k^4 + B_k Y_k^6 + C_k Y_k^8 + D_k Y_k^{10}$$

wherein the reference symbol rk represents the radius of curvature of an aspherical surface of interest as measured in the vicinity of the optical axis (the radius of curvature on the reference sphere of the aspherical surface of interest), the reference symbols $A_k$, $B_k$, $C_k$ and $D_k$ designate the aspherical surface coefficients, and the reference symbol k means that the k'th surface is designed as the aspherical surface.

BRIEF DESCRIPTION OF THE PREFERRED EMBODIMENTS

DETAILED DESCRIPTION OF THE PREFERRED EMBODIMENTS

Figure 1:
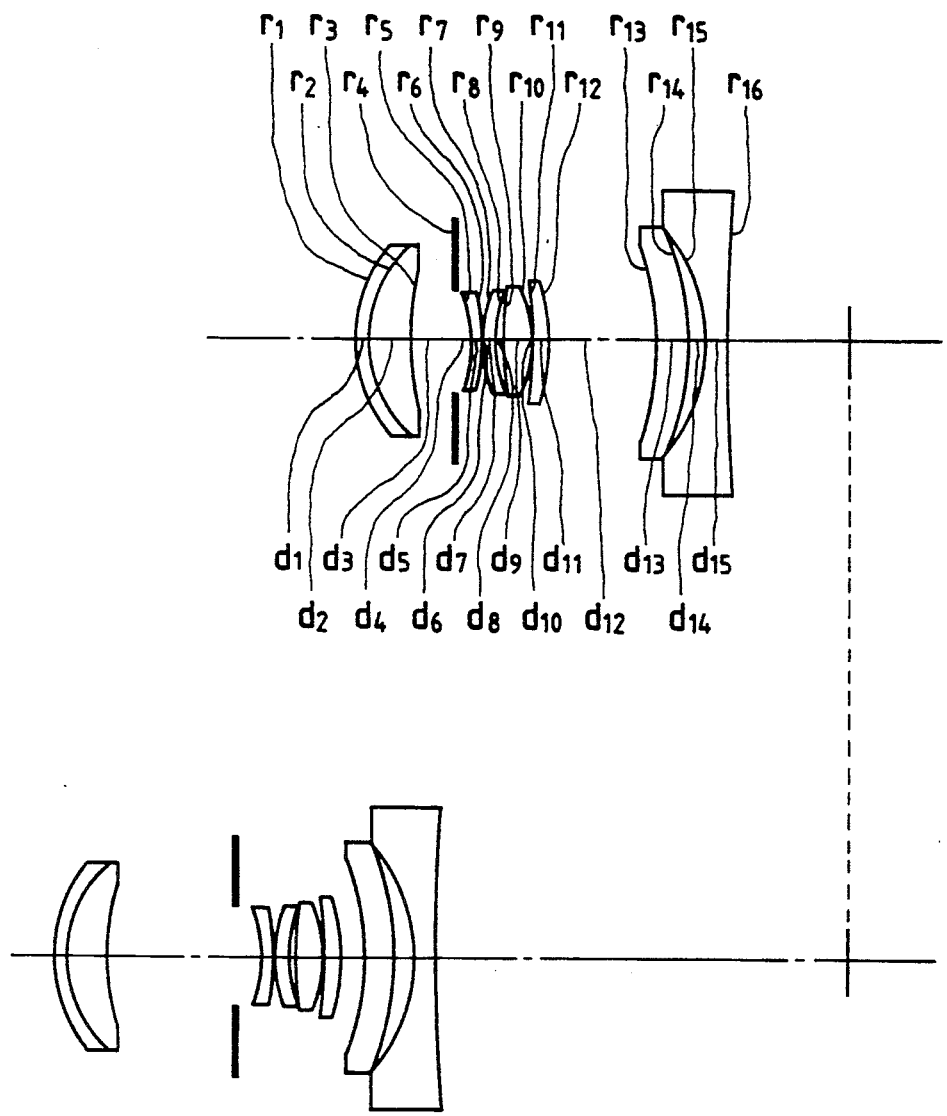
FIG. 1 through FIG. 5 show sectional views illustrating compositions of Embodiments 1 through 5 of the zoom lens system according to the present invention.
Figure 2:
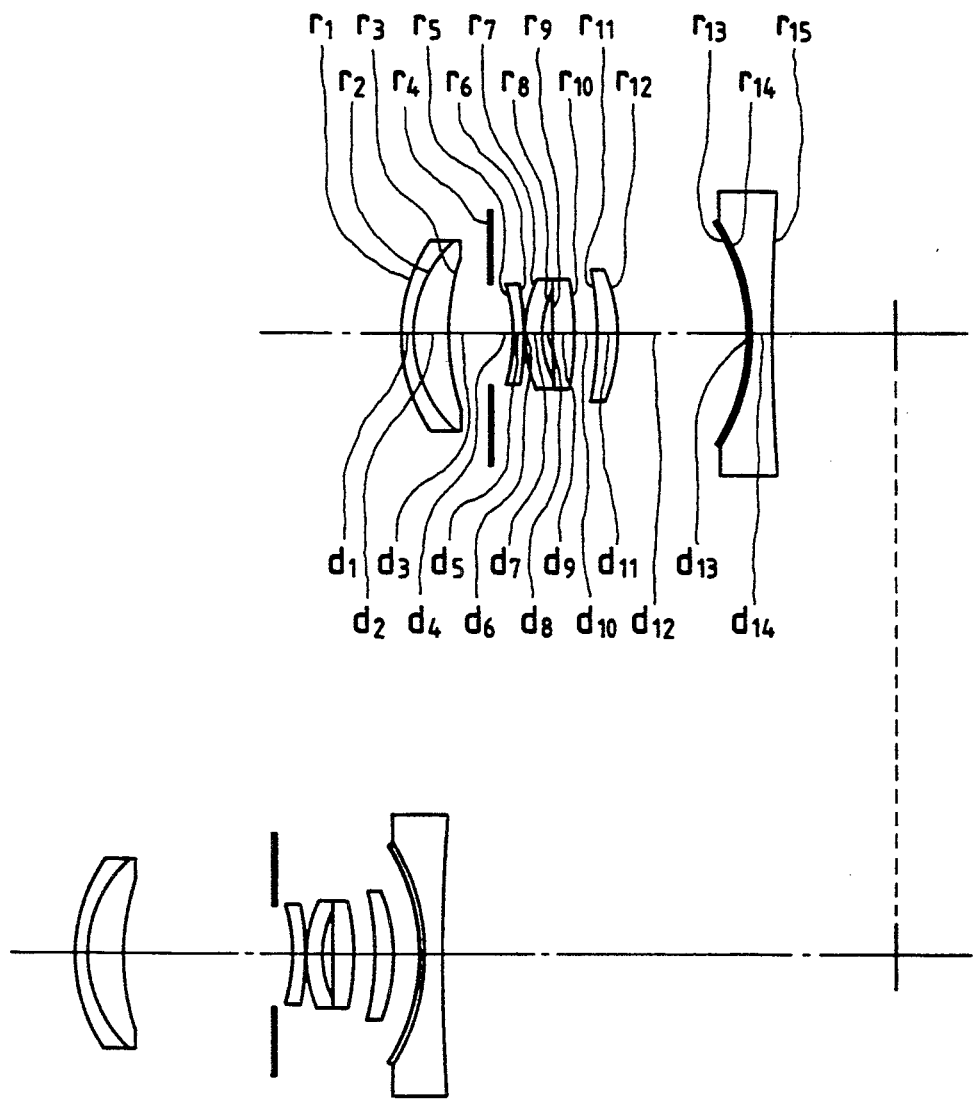
Figure 3:
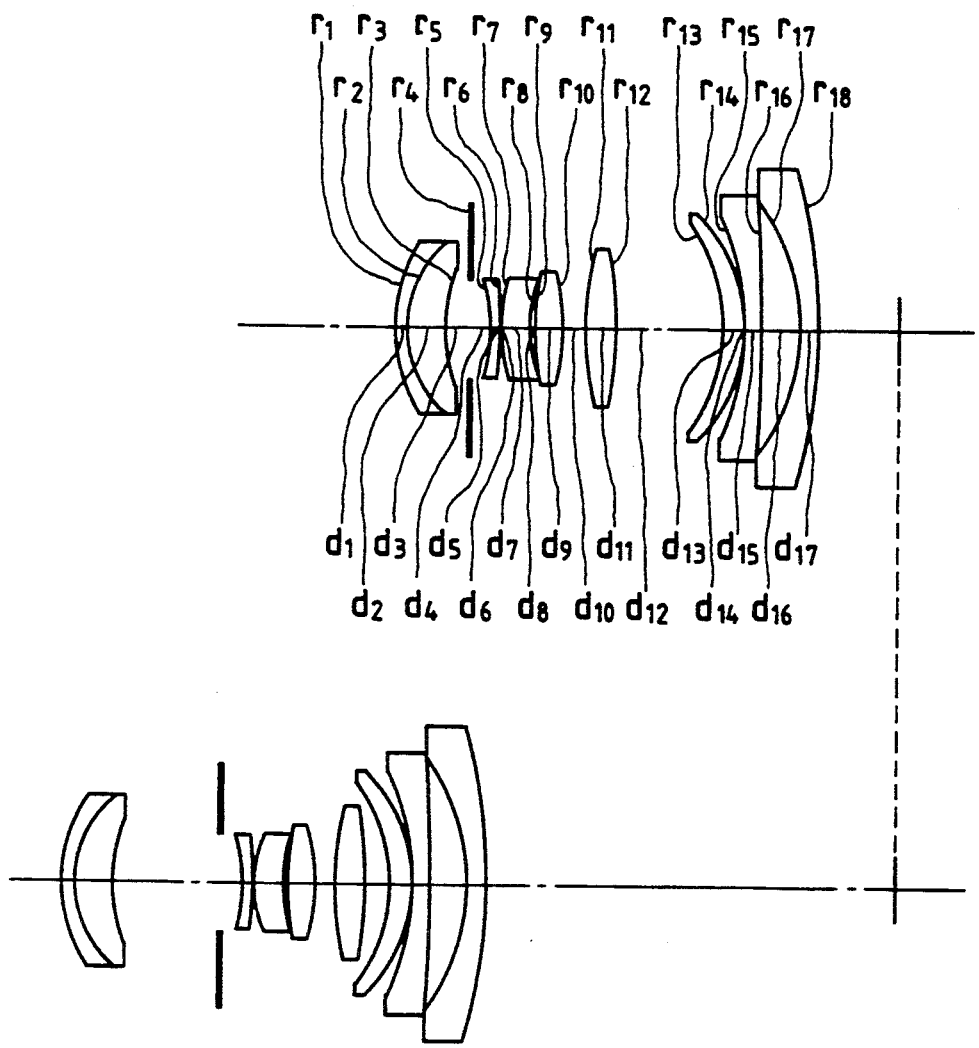
Figure 4:
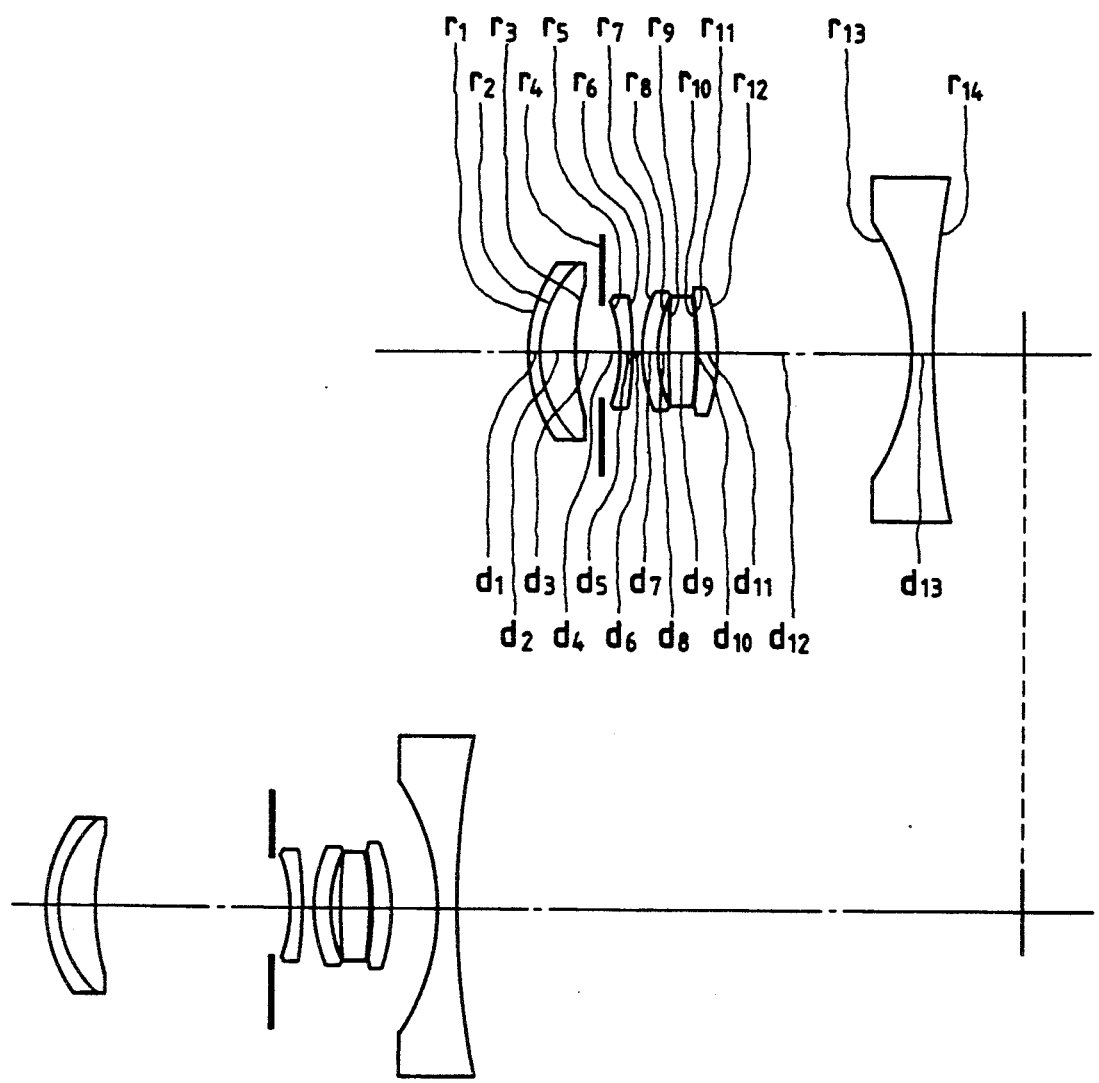
Figure 5:
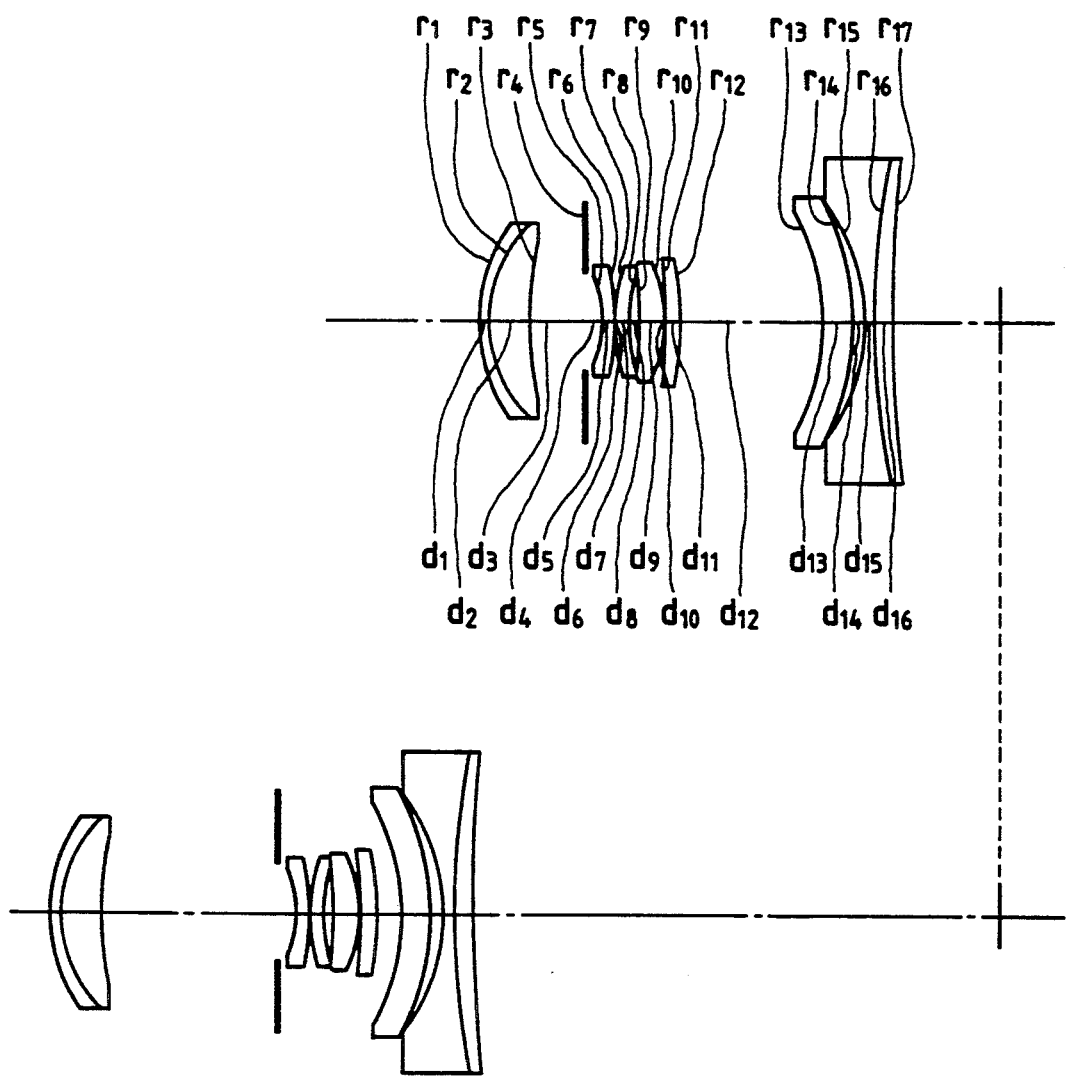
Figure 6:
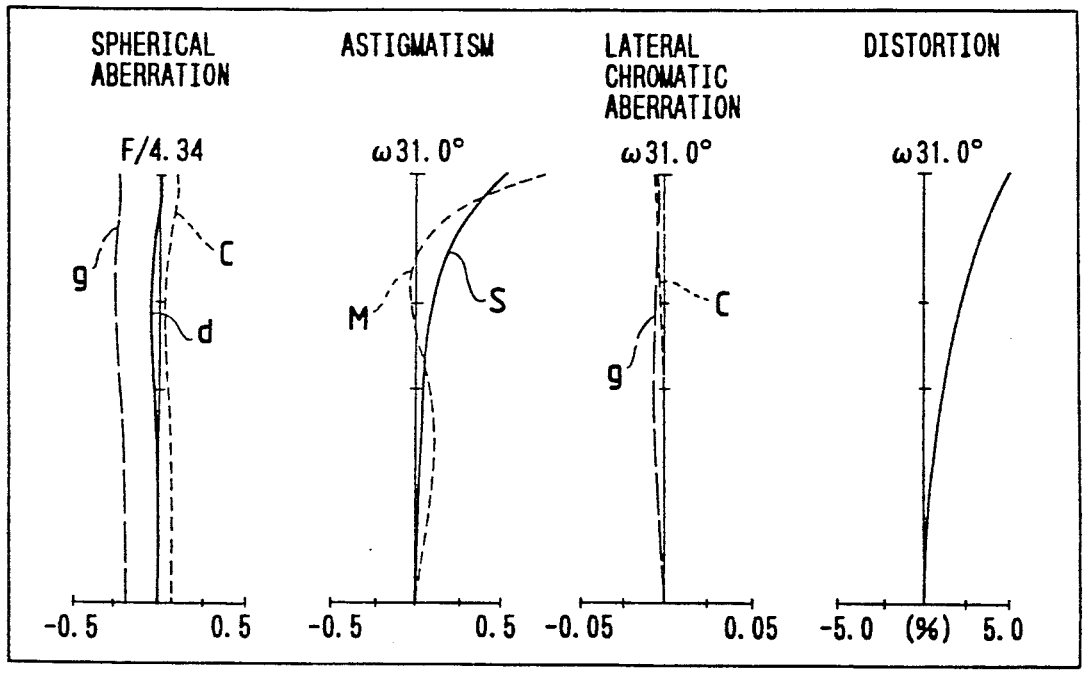
FIG. 6, FIG. 7 and FIG. 8 show graphs illustrating aberration characteristics at the wide position, intermediate focal length and tele position respectively of the Embodiment 1 of the present invention.
Figure 7:
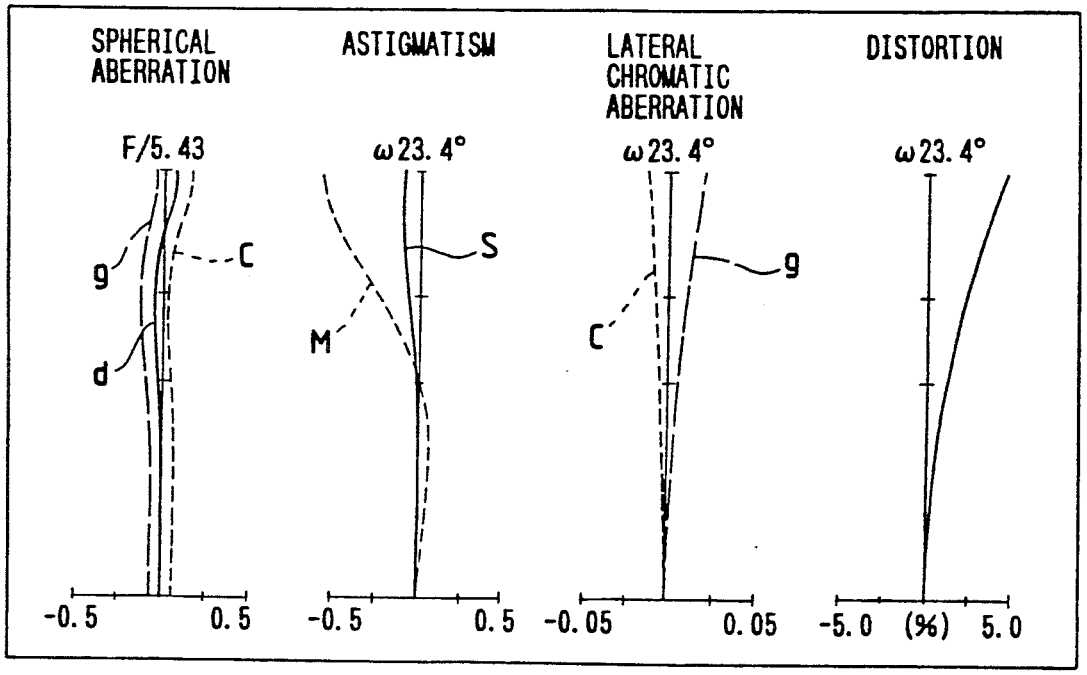
Figure 8:
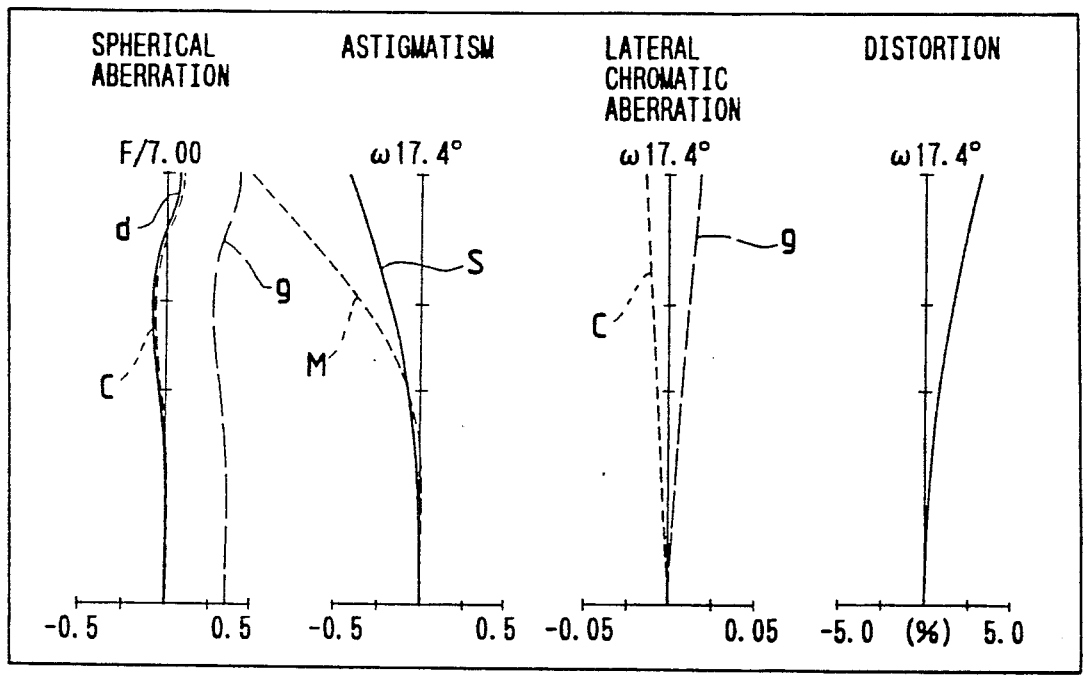
Figure 9:
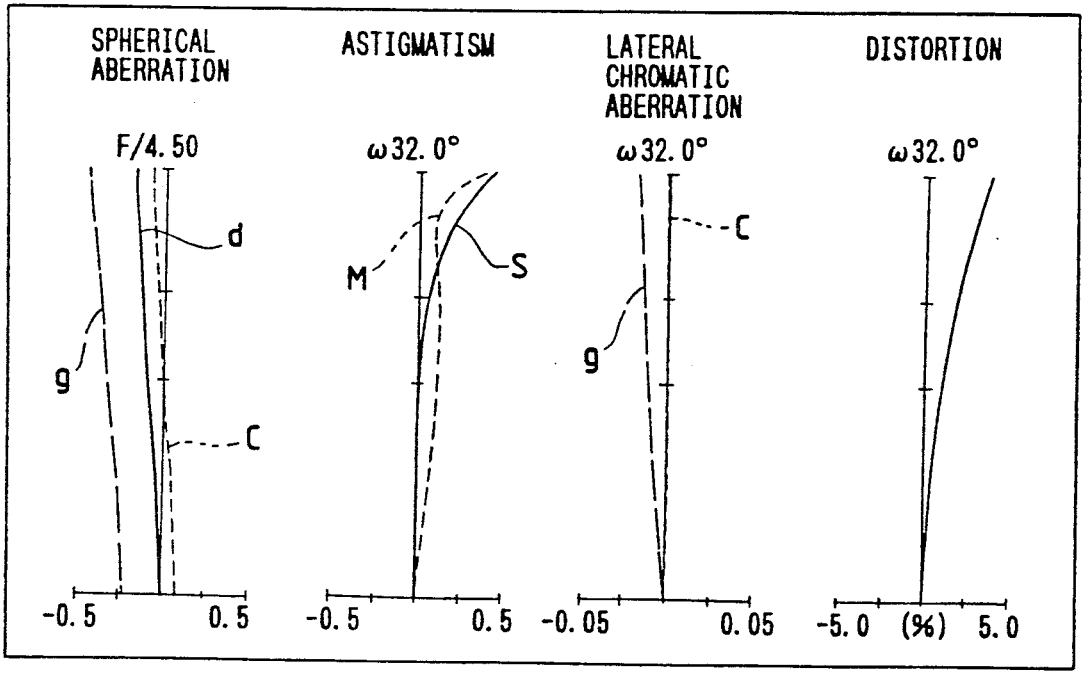
FIG. 9, FIG. 10 and FIG. 11 show graphs illustrating aberration characteristics at the wide position, intermediate focal length and tele position respectively of the Embodiment 2 of the present invention.
Figure 10:
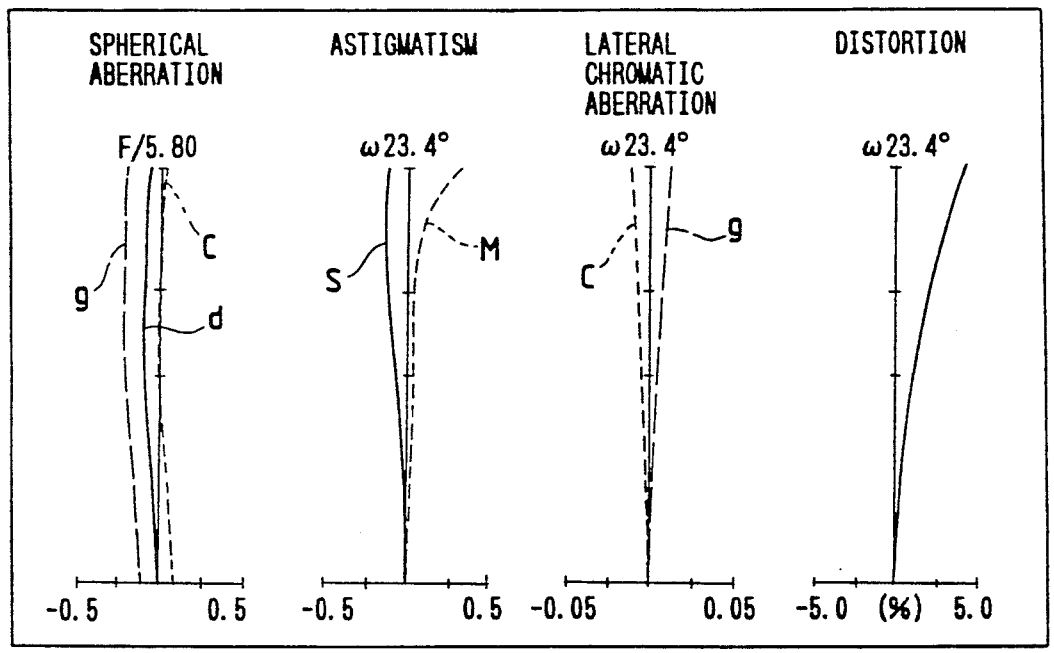
Figure 11:
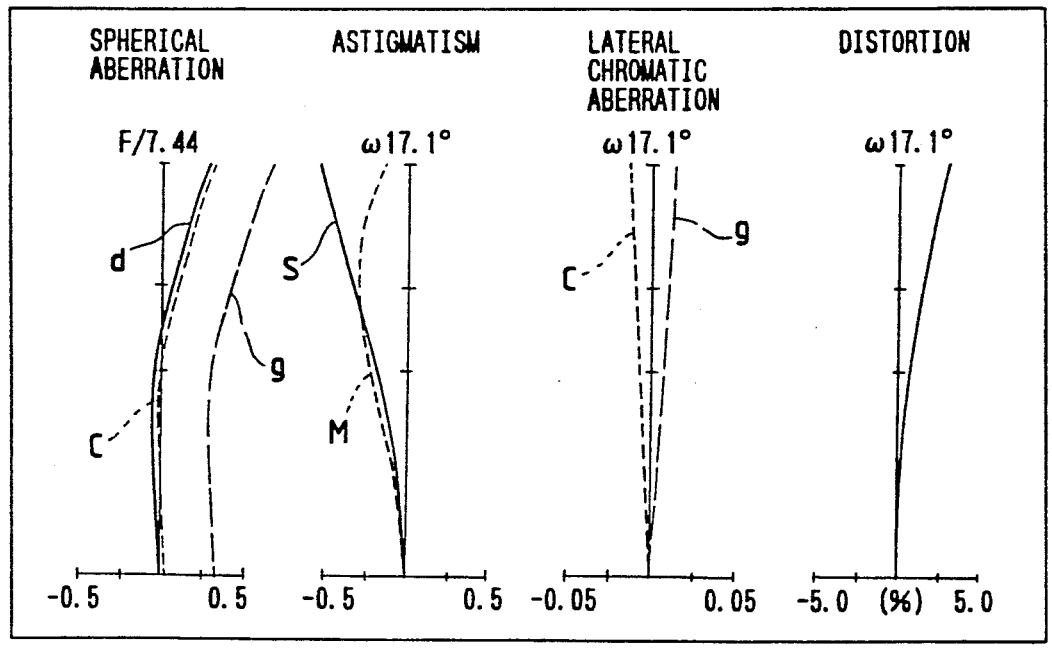
Figure 12:
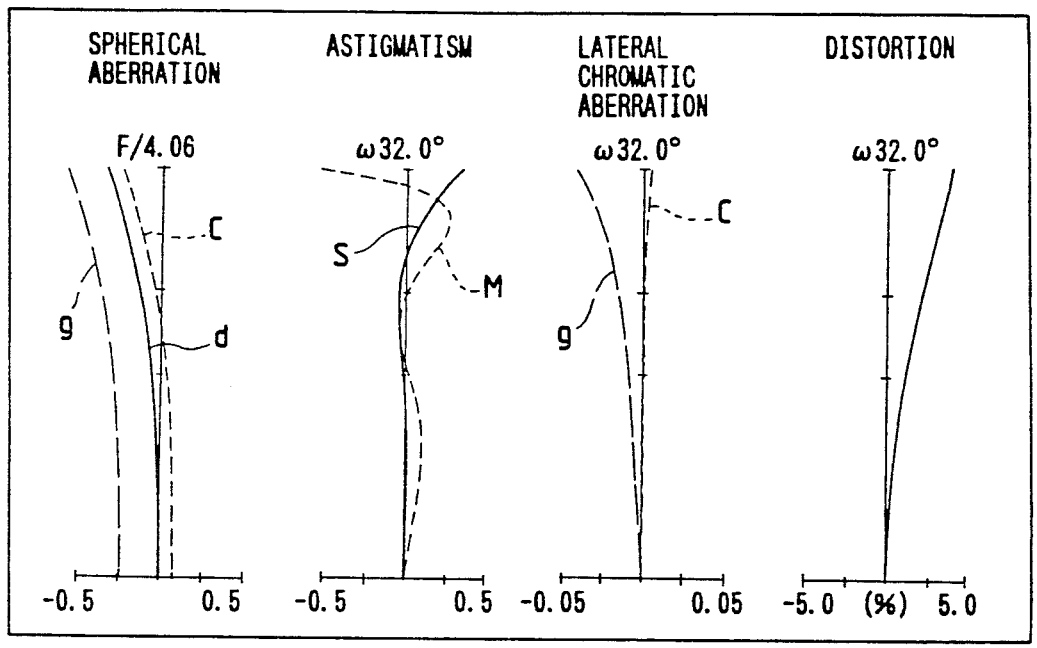
FIG. 12, FIG. 13 and FIG. 14 show curves illustrating aberration characteristics at the wide position, intermediate focal length and tele position respectively of the Embodiment 3 of the present invention.
Figure 13:
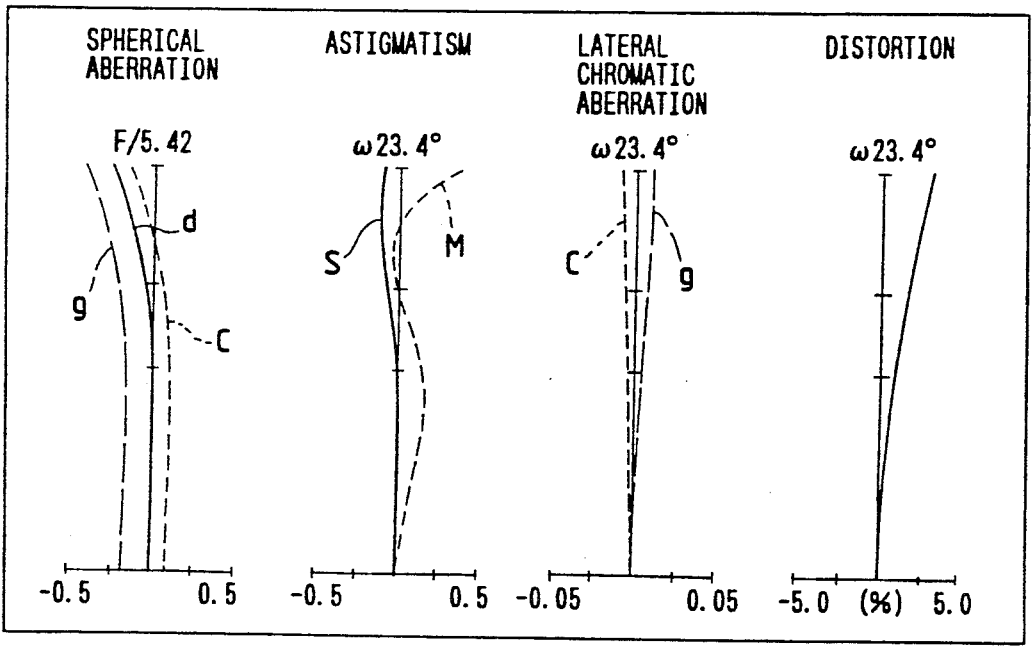
Figure 14:
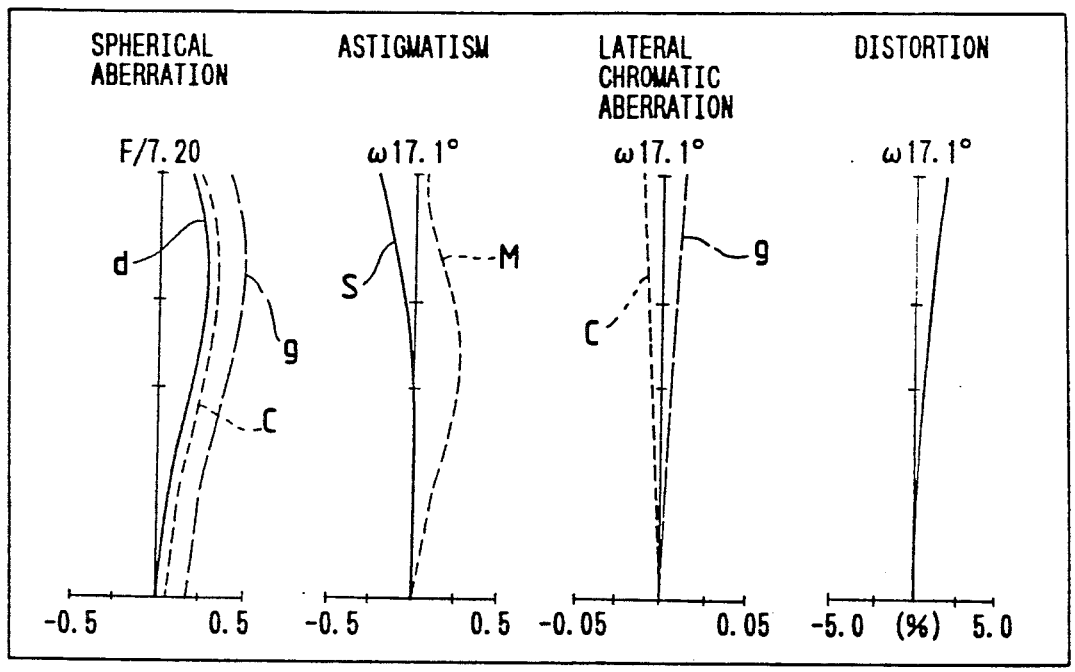
Figure 15:
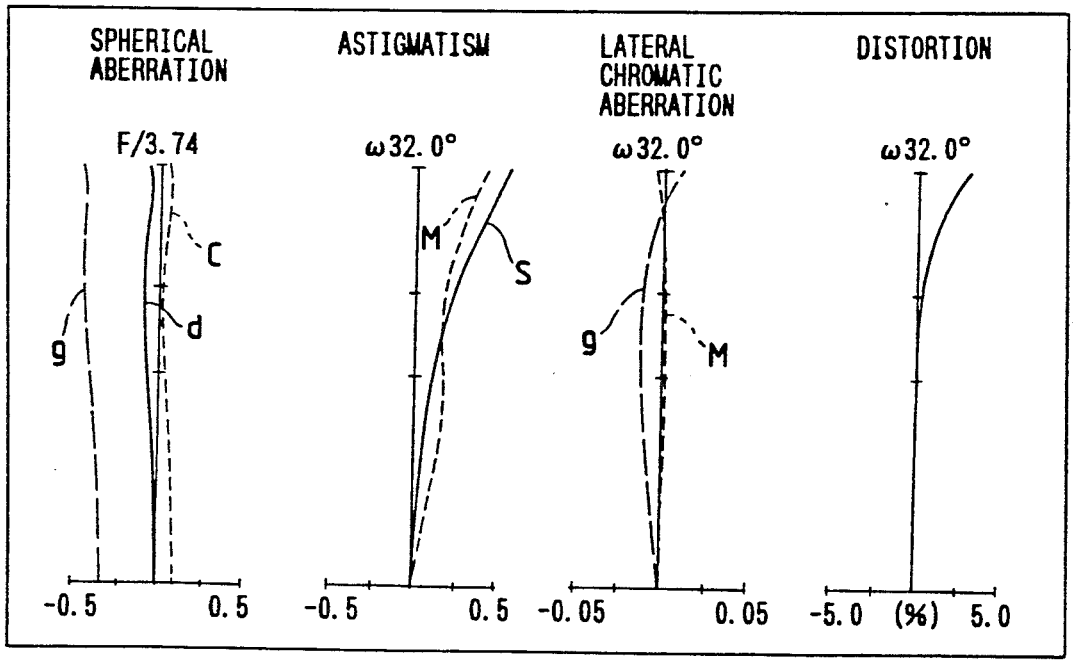
FIG. 15, FIG. 16 and FIG. 17 show curves visualizing aberration characteristics at the wide position, intermediate focal length and tele position respectively of the Embodiment 4 of the present invention.
Figure 16:
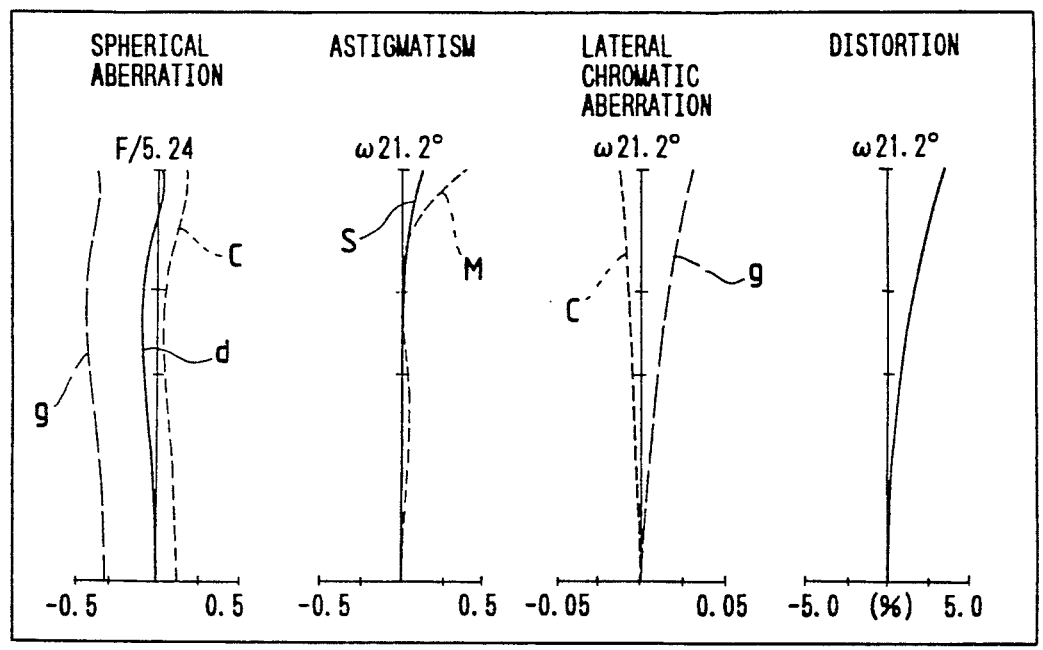
Figure 17:
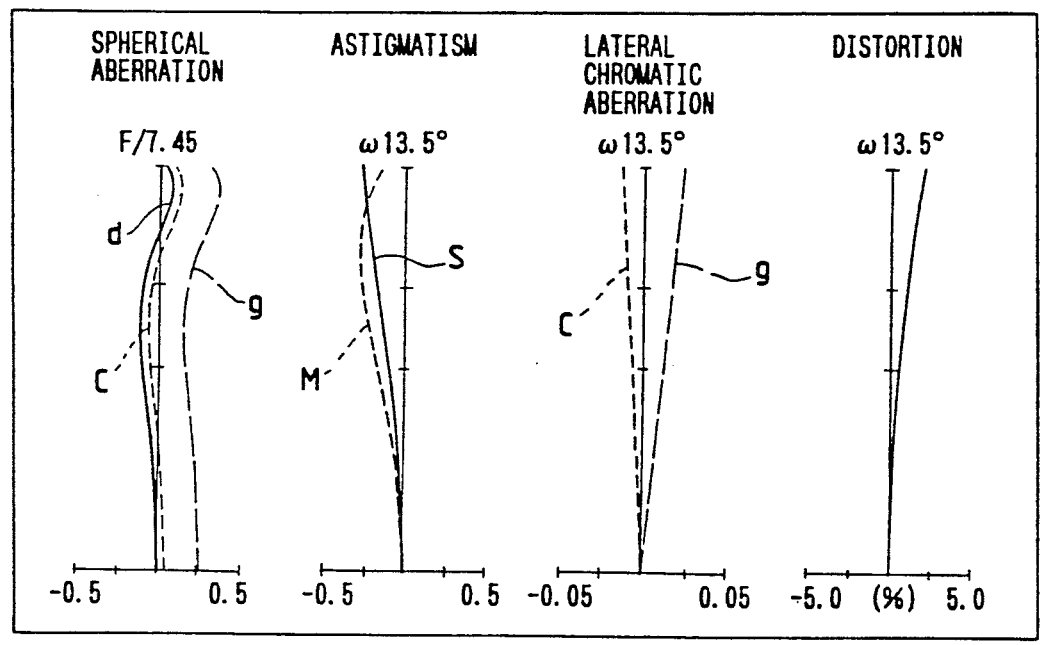
Figure 18:
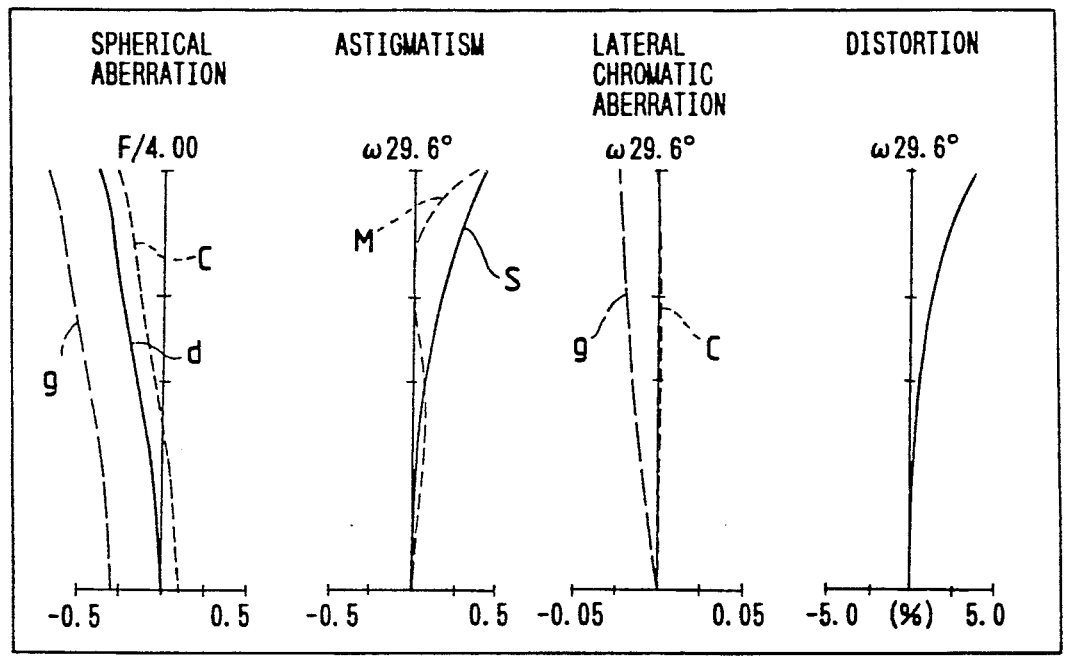
FIG. 18, FIG. 19 and FIG. 20 show graphs visualizing aberration characteristics at the wide position, intermediate focal length and tele position of the Embodiment 5 of the present invention.
Figure 19:
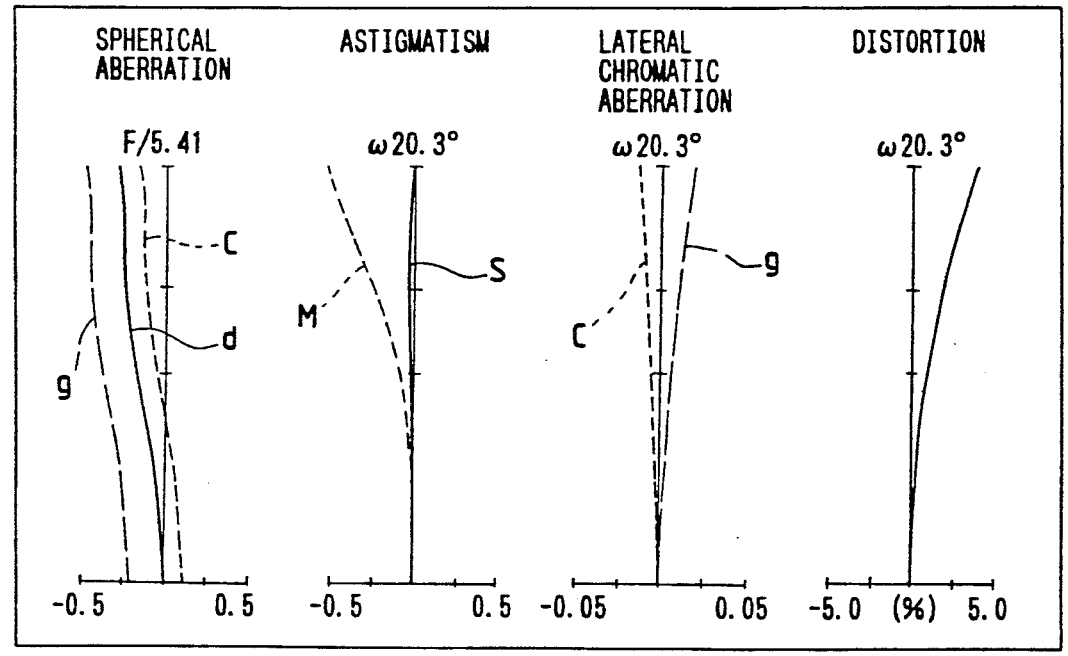
Figure 20:
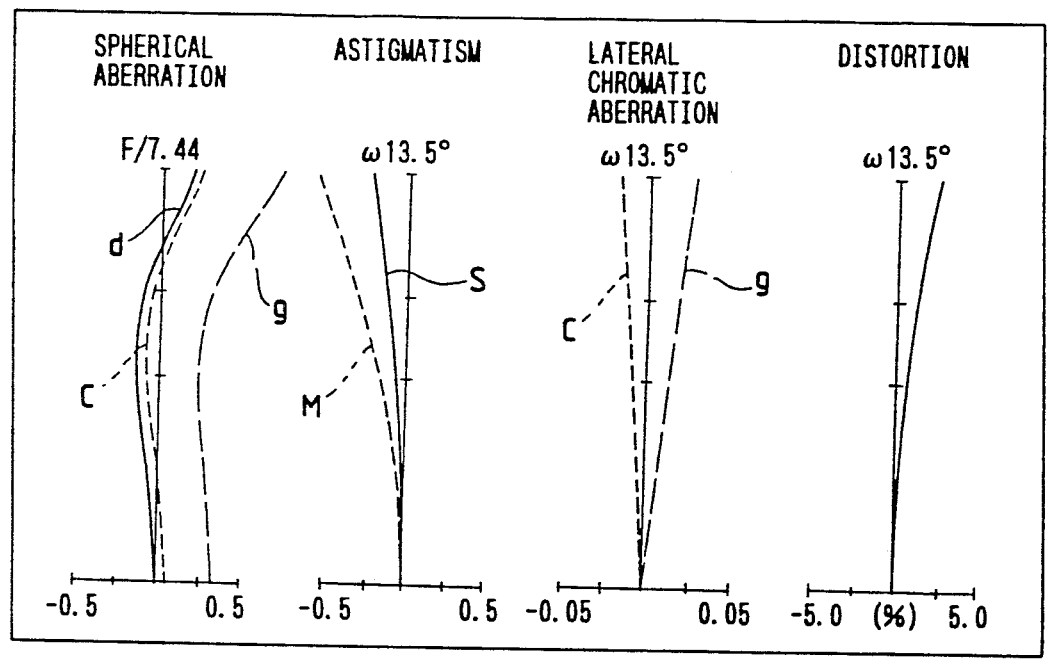

Now, the compact zoom lens system according to the present invention will be described in more detail with reference to the embodiments illustrated in the accompanying drawings and given in the form of the following numerical data:

| Embodiment 1 $f = 36 \sim 69$ mm, F/4.34 $\sim$ F/7.00 | | | |
| --- | --- | --- | --- |
| $r_1 = 12.1622$ | | | |
| | $d_1 = 1.0000$ | $n_1 = 1.72825$ | $v_1 = 28.46$ |
| $r_2 = 9.5842$ | | | |
| | $d_2 = 3.2327$ | $n_2 = 1.51633$ | $v_2 = 64.15$ |
| $r_3 = 21.3646$ | | | |
| | $d_3 = l_1$ | | |

-continued

Embodiment 1
f = 36~69 mm, F/4.34~F/7.00

| | | | |
|---|---|---|---|
| $r_4 = \infty$ (stop) | | | |
| | $d_4 = 1.6092$ | | |
| $r_5 = -9.9972$ | | | |
| | $d_5 = 0.8000$ | $n_3 = 1.83400$ | $\nu_3 = 37.16$ |
| $r_6 = -24.0435$ | | | |
| | $d_6 = 0.1000$ | | |
| $r_7 = 10.8709$ | | | |
| | $d_7 = 1.0000$ | $n_4 = 1.78472$ | $\nu_4 = 25.71$ |
| $r_8 = 10.2303$ | | | |
| | $d_8 = 0.6024$ | | |
| $r_9 = 28.6690$ | | | |
| | $d_9 = 2.3790$ | $n_5 = 1.56384$ | $\nu_5 = 60.69$ |
| $r_{10} = -11.1168$ (aspherical surface) | | | |
| | $d_{10} = 0.1500$ | | |
| $r_{11} = -22.1167$ | | | |
| | $d_{11} = 1.1949$ | $n_6 = 1.78472$ | $\nu_6 = 25.71$ |
| $r_{12} = -17.0012$ | | | |
| | $d_{12} = l_2$ (variable) | | |
| $r_{13} = -22.7663$ | | | |
| | $d_{13} = 2.5000$ | $n_7 = 1.49216$ | $\nu_7 = 57.50$ |
| $r_{14} = -26.8480$ (aspherical surface) | | | |
| | $d_{14} = 1.5974$ | | |
| $r_{15} = -13.1638$ | | | |
| | $d_{15} = 1.7000$ | $n_8 = 1.51633$ | $\nu_8 = 64.15$ |
| $r_{16} = 149.9658$ | | | |

Aspherical surface coefficients $A_{10} = 0.16073 \times 10^{-3}$
$B_{10} = -0.24044 \times 10^{-5}$
$C_{10} = 0.26479 \times 10^{-6}$
$D_{10} = -0.88591 \times 10^{-8}$
$A_{14} = -0.85285 \times 10^{-4}$
$B_{14} = -0.83127 \times 10^{-7}$
$C_{14} = -0.13005 \times 10^{-8}$

| f | 36 | 50 | 69 |
|---|---|---|---|
| $l_1$ | 3.793 | 7.662 | 10.725 |
| $l_2$ | 8.841 | 4.972 | 1.908 |

$D_1/IH = 0.20$, $H_2/IH = 0.13$, $\Phi_1/\Phi_W = 0.62$
$\Phi_{12W}/\Phi_W = 1.55$, $\beta_{3T}/\beta_{3W} = 1.72$, $\nu_p - \nu_n = 36$
$r_1 \cdot \Phi_W = 0.35$, $|R_{22}| \cdot \Phi_W = 0.67$, $R_{23} \cdot \Phi_W = 0.30$
$\Phi_{2k}/\Phi_2 = 2.06$

Embodiment 2
f = 35~70 mm, F/4.50~F/7.44

| | | | |
|---|---|---|---|
| $r_1 = 14.2166$ | | | |
| | $d_1 = 1.0500$ | $n_1 = 1.78472$ | $\nu_1 = 25.71$ |
| $r_2 = 10.5466$ | | | |
| | $d_2 = 2.6711$ | $n_2 = 1.72000$ | $\nu_2 = 50.25$ |
| $r_3 = 19.4623$ | | | |
| | $d_3 = l_1$ (variable) | | |
| $r_4 = \infty$ (stop) | | | |
| | $d_4 = 1.3200$ | | |
| $r_5 = -13.8694$ | | | |
| | $d_5 = 0.8000$ | $n_3 = 1.83400$ | $\nu_3 = 37.16$ |
| $r_6 = -36.1091$ | | | |
| | $d_6 = 0.1000$ | | |
| $r_7 = 11.1824$ | | | |
| | $d_7 = 1.3767$ | $n_4 = 1.74320$ | $\nu_4 = 49.31$ |
| $r_8 = 11.1428$ | | | |
| | $d_8 = 0.7143$ | | |
| $r_9 = 40.7934$ | | | |
| | $d_9 = 1.8992$ | $n_5 = 1.56384$ | $\nu_5 = 60.69$ |
| $r_{10} = -19.5472$ (aspherical surface) | | | |
| | $d_{10} = 1.5738$ | | |
| $r_{11} = -27.8000$ | | | |
| | $d_{11} = 1.8300$ | $n_6 = 1.57501$ | $\nu_6 = 41.49$ |
| $r_{12} = -12.4168$ | | | |
| | $d_{12} = l_2$ (variable) | | |

-continued

Embodiment 2
f = 35~70 mm, F/4.50~F/7.44

| | | | |
|---|---|---|---|
| $r_{13} = -13.0391$ (aspherical surface) | | | |
| | $d_{13} = 0.1000$ | $n_7 = 1.52492$ | $\nu_7 = 51.77$ |
| $r_{14} = -17.4010$ | | | |
| | $d_{14} = 1.5796$ | $n_8 = 1.51633$ | $\nu_8 = 64.15$ |
| $r_{15} = 181.2880$ | | | |

Aspherical surface coefficients $A_{10} = 0.13581 \times 10^{-3}$
$B_{10} = 0.59395 \times 10^{-5}$
$C_{10} = -0.49882 \times 10^{-6}$
$D_{10} = 0.17117 \times 10^{-7}$
$A_{13} = 0.65586 \times 10^{-4}$
$B_{13} = 0.87679 \times 10^{-6}$
$C_{13} = -0.65144 \times 10^{-8}$
$D_{13} = 0.37310 \times 10^{-10}$

| f | 25 | 50 | 70 |
|---|---|---|---|
| $l_1$ | 4.029 | 8.779 | 12.374 |
| $l_2$ | 10.478 | 5.728 | 2.133 |

$D_1/IH = 0.17$, $H_2/IH = 0.13$, $\Phi_1/\Phi_W = 0.57$
$\Phi_{12W}/\Phi_W = 1.46$, $\beta_{3T}/\beta_{3W} = 1.76$, $\nu_p - \nu_n = 24.54$,
$r_1 \cdot \Phi_W = 0.41$, $|R_{22}| \cdot \Phi_W = 1.03$, $R_{23} \cdot \Phi_W = 0.32$
$\Phi_{2R}/\Phi_2 = 1.74$, $\nu_p - 2N = 24.54$

Embodiment 3
f = 35~70 mm, F/4.06~F/7.20

| | | | |
|---|---|---|---|
| $r_1 = 12.1053$ | | | |
| | $d_1 = 0.9500$ | $n_1 = 1.76182$ | $\nu_1 = 26.55$ |
| $r_2 = 8.6794$ | | | |
| | $d_2 = 3.1673$ | $n_2 = 1.62374$ | $\nu_2 = 47.10$ |
| $r_3 = 15.4079$ | | | |
| | $d_3 = l_1$ (variable) | | |
| $r_4 = \infty$ (stop) | | | |
| | $d_4 = 1.2803$ | | |
| $r_5 = -12.1406$ | | | |
| | $d_5 = 0.7107$ | $n_3 = 1.58904$ | $\nu_3 = 53.20$ |
| $r_6 = -50.4567$ | | | |
| | $d_6 = 0.1000$ | | |
| $r_7 = 12.7936$ | | | |
| | $d_7 = 2.3159$ | $n_4 = 1.67270$ | $\nu_4 = 32.10$ |
| $r_8 = 12.1983$ | | | |
| | $d_8 = 0.4071$ | | |
| $r_9 = 27.9667$ | | | |
| | $d_9 = 2.0993$ | $n_5 = 1.51633$ | $\nu_5 = 64.15$ |
| $r_{10} = -19.5626$ | | | |
| | $d_{10} = 1.8038$ | | |
| $r_{11} = 33.3262$ | | | |
| | $d_{11} = 2.3263$ | $n_6 = 1.56384$ | $\nu_6 = 60.69$ |
| $r_{12} = -35.3802$ (aspherical surface) | | | |
| | $d_{12} = l_2$ (variable) | | |
| $r_{13} = -13.5443$ | | | |
| | $d_{13} = 1.5848$ | $n_7 = 1.84666$ | $\nu_7 = 23.78$ |
| $r_{14} = -12.5442$ | | | |
| | $d_{14} = 0.1163$ | | |
| $r_{15} = -21.0657$ | | | |
| | $d_{15} = 1.3800$ | $n_8 = 1.77250$ | $\nu_8 = 49.66$ |
| $r_{16} = -111.9229$ | | | |
| | $d_{16} = 2.9383$ | | |
| $r_{17} = -18.0059$ | | | |
| | $d_{17} = 1.5800$ | $n_9 = 1.71300$ | $\nu_9 = 53.84$ |
| $r_{18} = -145.6037$ | | | |

Aspherical surface coefficients $A_{12} = 0.77404 \times 10^{-4}$
$B_{12} = -0.14976 \times 10^{-5}$
$C_{12} = 0.46999 \times 10^{-7}$
$D_{12} = -0.58373 \times 10^{-9}$

| f | 35 | 50 | 70 |
|---|---|---|---|
| $l_1$ | 2.413 | 6.323 | 9.146 |
| $l_2$ | 8.872 | 4.961 | 2.139 |

-continued

| Embodiment 3 |
|---|
| f = 35~70 mm, F/4.06~F/7.20 |

| $D_1/IH = 0.19$, | $H_2/IH = 0.14$, | $\Phi_1/\Phi_W = 0.43$ |
|---|---|---|
| $\Phi_{12W}/\Phi_W = 1.52$, | $\beta_{3T}/\beta_{3W} = 1.84$, | $\nu_p - \nu_n = 20.55$, |
| $r_1 \cdot \Phi_W = 0.34$, | $|R_{22}| \cdot \Phi_W = 1.44$, | $R_{23} \cdot \Phi_W = 0.36$ |
| $\Phi_{2R}/\Phi_2 = 1.74$ | | |

| Embodiment 4 |
|---|
| f = 35~90 mm, F/3.74~F/7.45 |

| $r_1 = 14.0136$ | | | |
|---|---|---|---|
| | $d_1 = 0.9990$ | $n_1 = 1.63980$ | $\nu_1 = 234.48$ |
| $r_2 = 10.6689$ | | | |
| | $d_2 = 2.9151$ | $n_2 = 1.48749$ | $\nu_2 = 70.20$ |
| $r_3 = 24.7274$ | | | |
| | $d_3 = l_1$ (variable) | | |
| $r_4 = \infty$ (stop) | | | |
| | $d_4 = 0.9995$ | | |
| $r_5 = -12.6296$ | | | |
| | $d_5 = 1.0193$ | $n_3 = 1.79952$ | $\nu_3 = 42.24$ |
| $r_6 = -27.9727$ | | | |
| | $d_6 = 0.7826$ | | |
| $r_7 = 12.1977$ | | | |
| | $d_7 = 1.4125$ | $n_4 = 1.74950$ | $\nu_4 = 35.27$ |
| $r_8 = 11.6861$ | | | |
| | $d_8 = 0.8005$ | | |
| $r_9 = 37.2819$ | | | |
| | $d_9 = 2.5457$ | $n_5 = 1.56384$ | $\nu_5 = 60.69$ |
| $r_{10} = -18.7435$ (aspherical surface) | | | |
| | $d_{10} = 0.3053$ | | |
| $r_{11} = -24.7473$ | | | |
| | $d_{11} = 1.5087$ | $n_6 = 1.65844$ | $\nu_6 = 50.86$ |
| $r_{12} = -15.3555$ | | | |
| | $d_{12} = l_2$ (variable) | | |
| $r_{13} = -15.7248$ (aspherical surface) | | | |
| | $d_{13} = 1.7985$ | $n_7 = 1.51633$ | $\nu_7 = 64.15$ |
| $r_{14} = 84.6331$ | | | |

| Aspherical surface coefficients |
|---|
| $A_{10} = 0.83865 \times 10^{-4}$ |
| $B_{10} = -0.12016 \times 10^{-7}$ |
| $C_{10} = 0.30902 \times 10^{-7}$ |
| $D_{10} = -0.95688 \times 10^{-9}$ |
| $A_{13} = 0.52462 \times 10^{-4}$ |
| $B_{13} = 0.29470 \times 10^{-6}$ |
| $C_{13} = -0.16378 \times 10^{-8}$ |
| $D_{13} = 0.55390 \times 10^{-11}$ |

| f | 35 | 55.7 | 90 |
|---|---|---|---|
| $l_1$ | 2.9 | 9.959 | 15.281 |
| $l_2$ | 16.283 | 9.235 | 3.916 |

| $D_1/IH = 0.18$, | $H_2/IH = 0.10$, | $\Phi_1/\Phi_W = 0.48$ |
|---|---|---|
| $\Phi_{12W}/\Phi_W = 1.33$, | $\beta_{3T}/\beta_{3W} = 2.19$, | $\nu_p - \nu_n = 35.72$, |
| $r_1 \cdot \Phi_W = 0.40$, | $|R_{22}| \cdot \Phi_W = 0.80$, | $R_{23} \cdot \Phi_W = 0.35$ |
| $\Phi_{2R}/\Phi_2 = 1.83$ | | |

| Embodiment 5 |
|---|
| f = 38~90 mm, F/4.00~F/7.44 |

| $r_1 = 14.5863$ | | | |
|---|---|---|---|
| | $d_1 = 1.0989$ | $n_1 = 1.72151$ | $\nu_1 = 29.24$ |
| $r_2 = 11.5034$ | | | |
| | $d_2 = 2.9786$ | $n_2 = 1.51821$ | $\nu_2 = 65.04$ |
| $r_3 = 30.2408$ | | | |
| | $d_3 = l_1$ (variable) | | |
| $r_4 = \infty$ (stop) | | | |
| | $d_4 = 1.6588$ | | |
| $r_5 = -10.5855$ | | | |
| | $d_5 = 1.0272$ | $n_3 = 1.80610$ | $\nu_3 = 40.95$ |
| $r_6 = -26.6139$ | | | |
| | $d_6 = 0.0997$ | | |

| Embodiment 5 |
|---|
| f = 38~90 mm, F/4.00~F/7.44 |

| $r_7 = 18.1864$ | | | |
|---|---|---|---|
| | $d_7 = 1.0776$ | $n_4 = 1.72825$ | $\nu_4 = 28.46$ |
| $r_8 = 16.0750$ | | | |
| | $d_8 = 0.5992$ | | |
| $r_9 = 49.7734$ | | | |
| | $d_9 = 2.4180$ | $n_5 = 1.56384$ | $\nu_5 = 60.69$ |
| $r_{10} = -11.7145$ (aspherical surface) | | | |
| | $d_{10} = 0.1994$ | | |
| $r_{11} = -36.4049$ | | | |
| | $d_{11} = 1.2383$ | $n_6 = 1.80610$ | $\nu_6 = 33.27$ |
| $r_{12} = -22.0972$ | | | |
| | $d_{12} = l_2$ (variable) | | |
| $r_{13} = -18.7079$ | | | |
| | $d_{13} = 2.3995$ | $n_7 = 1.50137$ | $\nu_7 = 56.40$ |
| $r_{14} = -26.4644$ (aspherical surface) | | | |
| | $d_{14} = 1.1300$ | | |
| $r_{15} = -17.1323$ | | | |
| | $d_{15} = 0.8497$ | $n_8 = 1.51821$ | $\nu_8 = 65.04$ |
| $r_{16} = 73.0838$ | | | |
| | $d_{16} = 1.3998$ | $n_9 = 1.67270$ | $\nu_9 = 32.10$ |
| $r_{17} = 110.9606$ | | | |

| Aspherical surface coefficients |
|---|
| $A_{10} = 0.70720 \times 10^{-4}$ |
| $B_{10} = 0.55535 \times 10^{-6}$ |
| $C_{10} = -0.10010 \times 10^{-7}$ |
| $D_{10} = -0.10004 \times 10^{-9}$ |
| $A_{14} = -0.51377 \times 10^{-4}$ |
| $B_{14} = -0.11688 \times 10^{-6}$ |
| $C_{14} = 0.24779 \times 10^{-9}$ |

| f | 38 | 58.4 | 90 |
|---|---|---|---|
| $l_1$ | 4.693 | 10.344 | 14.688 |
| $l_2$ | 12.101 | 6.450 | 2.106 |

| $D_1/IH = 0.19$, | $H_2/IH = 0.09$, | $\Phi_1/\Phi_W = 0.64$ |
|---|---|---|
| $\Phi_{12W}/\Phi_W = 1.50$, | $\beta_{3T}/\beta_{3W} = 2.03$, | $\nu_p - \nu_n = 35.8$ |
| $r_1 \cdot \Phi_W = 0.38$, | $|R_{22}| \cdot \Phi_W = 0.70$, | $R_{23} \cdot \Phi_W = 0.48$, |
| $\Phi_{2R}/\Phi_2 = 2.15$ | | | wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abb's numbers of the respective lens elements.

The Embodiment 1 is designed in such a manner that the aspherical lens component used in the third lens unit has an extremely weak refractive power so that aberrations will be corrected nearly by the spherical surface alone, and that the imaging performance of the zoom lens system will be varied little by variations of temperature and humidity even when the aspherical lens component is made of a plastic material.

Further, the Embodiments 1 through 5 are designed so as to allow no variations of the diameters of the aperture stops to be caused due to variations of focal lengths, thereby making it possible to simplify the structures of the lens barrels.

As is understood from the foregoing descriptions, the present invention has succeeded in providing a compact zoom lens system which adopts the paraxial power distribution permitting favorable correction of aberrations and has a total length remarkably shortened by reducing the length of the first lens unit.

Further, the present invention has succeeded in providing a compact zoom lens system which has a short total length and favorably corrects aberrations by selecting an adequate composition for the second lens unit.

We claim:

1. A zoom lens system comprising, in order from the object side:

a first lens unit having a positive refractive power, an aperture stop, a second lens unit having a positive refractive power, and a third lens unit having a negative refractive power, wherein said zoom lens system performs variation of focal length from the wide position to the tele position by moving said first lens unit and said third lens unit toward the object side, and displacing said second lens unit and said aperture stop integrally so as to widen an airspace reserved between the first lens unit and the second lens unit, and so as to narrow an airspace reserved between the second lens unit and the third lens unit, and wherein said zoom lens system satisfies the following condition (1):

$$0.09 < D_1/IH < 0.32 \tag{1}$$

wherein the reference symbol $D'$ represents the thickness of the first lens unit and the reference symbol IH designates the length equal to half the diagonal line of the image surface.

2. A zoom lens system according to claim 1 wherein the second lens unit comprises a negative meniscus lens component having a concave surface on the object side and a lens component having a convex surface on the object side.

3. A zoom lens system comprising, in order from the object side:

a first lens unit having a positive refractive power, an aperture stop, a second lens unit comprising, in order from the object side, a negative meniscus lens component having a concave surface on the object side and a lens component having a convex surface on the object side, said second lens unit having a positive refractive power as a whole, and a third lens unit having a negative refractive power, wherein said zoom lens system performs variation of focal length from the wide position to the tele position by moving said first lens unit and said third lens unit toward the object side, and displacing said second lens unit and said aperture stop integrally so as to widen an airspace reserved between the first lens unit and the second lens unit, and narrow an airspace reserved between the second lens unit and the third lens unit.

4. A zoom lens system according to claim 3 or 2 wherein the second lens unit satisfies the following conditions (2) and (3):

$$0.5 < |R_{22}| \cdot \Phi_W < 2 \tag{2}$$

$$0.2 < |R_{23}| \cdot \Phi_W < 0.6 \tag{3}$$

wherein the reference symbols $R_{22}$ and $R_{23}$ represent the radii of curvature on the second surface and the third surface respectively as counted from the object side in the second lens unit, and the reference symbol $\Phi_W$ designates the refractive power of the zoom lens system as a whole at the wide position.

5. A zoom lens system according to claim 4 wherein an air lens is formed between the second surface and the third surface as counted from the object side in the second lens unit, and said air lens satisfies the following condition (4):

$$1.2 < \Phi_{2R}/\Phi_2 < 3 \tag{4}$$

wherein the reference symbol $\Phi_{2R}$ represents the refractive power of the image side surface of the air lens and the reference symbol $\Phi_2$ designates the refractive power of the second lens unit.

6. A zoom lens system according to claim 5 wherein the second lens unit satisfies the following condition 5 (5):

$$0.03 < H_2/IH < 0.24 \tag{5}$$

wherein the reference symbol $H_2$ represents the distance as measured between the principal points of the second lens unit and the reference symbol IH designates the length equal to half the diagonal line of the image surface.

7. A zoom lens system according to claim 3 or 2 wherein the first lens unit comprises a positive lens element and a negative lens element.

8. A zoom lens system according to claim 7, wherein the first lens unit satisfies the following conditions (6) and (7):

$$10 < \nu_p - \nu_n 62 < \tag{6}$$

$$0.22 < r_1 \cdot \Phi_n < 1.14 \tag{7}$$

wherein the reference symbols $\nu_p$ and $\nu_n$ represent the Abbe's numbers of the positive lens element and the negative lens respectively, disposed in the first lens unit, the reference symbol $r_1$, designates the radius of curvature on the most object side surface of the first lens unit, and the reference symbol $\Phi_w$ denotes the refractive power of the zoom lens system as a whole at the wide position.

9. A zoom lens system according to claim 3 or 2 wherein the second lens unit and the third lens unit comprises aspherical surfaces.

10. A zoom lens system according to claim 1 or 2 wherein the first lens unit and the third lens unit are moved integrally for variation of focal length.

11. A zoom lens system according to claim 1 or 3 wherein the first lens unit comprises a surface convex toward the object side.

* * * * *